United States Patent [19]

Lehtipuu

[11] 3,949,523

[45] Apr. 13, 1976

[54] CELL STRUCTURE FOR THE RAISING OF SEEDLINGS

[75] Inventor: Tauno Lehtipuu, Helsinki, Finland

[73] Assignee: Enso-Gutzeit Osakeyitio, Helsinki, Finland

[22] Filed: Nov. 1, 1974

[21] Appl. No.: 520,133

[30] Foreign Application Priority Data

Jan. 9, 1974 Finland.............................. 5874/74

[52] U.S. Cl................................... 47/34.13; 47/37
[51] Int. Cl.²..................... A01G 9/02; A01C 11/00
[58] Field of Search.................... 47/34.13, 37–37.6; D9/184, 187, 190; D35/1; 53/14

[56] References Cited
UNITED STATES PATENTS

| | | | |
|---|---|---|---|
| 3,561,158 | 2/1971 | Marcan | D9/187 UX |
| 3,660,960 | 5/1972 | Inman | 53/14 |
| 3,667,159 | 6/1972 | Todd | 47/34.13 |
| D190,685 | 6/1961 | Roskam | D9/187 |

Primary Examiner—Edgar S. Burr
Assistant Examiner—James R. Feyrer
Attorney, Agent, or Firm—Toren, McGeady and Stanger

[57] ABSTRACT

A structure for use in the raising of seedlings and which consists of a plurality of cells lack having an open mouth and extending downwardly from a planar or horizontal plate, preferably formed from a sheet of plastic. The side walls of cell together define at least one acute angle. The side walls of each cell has an inwardly tapering shape so that they may fit one into the other when empty structures are stacked. The bottoms of the cells are permeable to water.

7 Claims, 6 Drawing Figures

CELL STRUCTURE FOR THE RAISING OF SEEDLINGS

SUMMARY OF THE INVENTION

In forest regeneration activities, in recent years, forest planting has been increasingly adopted instead of forest sowing. The procedure which is then followed is first to raise the seedlings in nurseries, from which they are transferred after a given period to be planted in the forest. It is important in forest planting to achieve that the greatest possible number of seedlings survive and start a good growth immediately after transplanting. Furthermore, the planting time should be made as long as possible, because naked-rooted seedlings may only be planted in the spring. In order to render this possible, the clod seedling has been developed, that is a seedling having a growth substrate surrounding its roots and which is transported and planted along with the seedling. The planting of clod seedlings is possible throughout the period of unfrozen soil.

A method for raising seedlings known in prior art has been disclosed e.g. in the Finnish Pat. No. 47,247, wherein the cells that are used are mutually joined with a water-soluble cement and they have been fitted in a frame, in which the cells are filled with growth substrate. The groups of cells are subsequently transferred upon base plates made e.g. of cardboard, whereby this base plate constitutes a bottom for the cells, preventing the substrate from dropping out. Resting on the base plates, cells may be stacked on top of each other, and after the fitting of top plates the groups of cells are finished to constitute packages, which are transferred to the raising sites. It is thus understood that in this procedure the groups of cells have to be packaged with great care, as they would otherwise obviously be liable to damage during transport to the raising sites. At the raising sites, again, the packages are unpacked, each group of cells separately is placed on a raising base, and the base plate is pulled out. The cells are then watered, whereby the seeds begin to germinate. In the course of irrigation during the raising stage, the cement binding the cells together is dissolved, whereby the cells with their seedlings are detached from each other, and the seedlings are planted at the desired site. This method comprises the following steps which are unnecessary in view of the raising of seedlings: packaging of the groups of cells in envelopes, and once more undoing these packages at the raising site.

The aim of the present invention is to eliminate the unnecessary steps in the handling of the seedlings. This is accomplished in that the raising of seedlings takes place in a structure made of plastic, which is one coherent unit composed of a plurality of (for instance, 40) mutually separated cells, which are filled with a substrate in the usual manner. The structure according to the invention is made from sheet plastic, the cells being formed in the sheet plastic by applying a deep-drawing process. The invention is characterized in that a pair of the side walls of the cell define at least one acute angle, that the side walls of each cell have a tapering shape so that they fit into one another when empty cells are stacked, and that the bottoms of the cells are permeable to water.

The acute angle provided by the side walls of each cell prevents the root of the seedling from winding about itself, which would result in the death of the sapling. Since the bottoms of the cells are perforated, the irrigation water does not stagnate on the bottoms of the cells. However, the material of the clod is well retained in the cells. Since the cell structure consists of plastic, there is far less risk of an entangling growth of the seedlings in the cells, which occurs when cells made of fibrous material are used, which rapidly decays during the raising period. It is thus understood that in a cell system according to the invention individual, separate clod seedlings can be produced, which are eminently suited for planting by machine means. Owing to their mechanical strength, the cells require no external package, and they can be transported as such, e.g. to the planting site, where the planter removes the seedling clods from the cells. The reusable, empty cell structures are stacked and returned for repeated sowing and filling.

BRIEF DESCRIPTION OF THE DRAWING

The invention is more closely described with the aid of the drawing, wherein.

DETAILED DESCRIPTION OF THE INVENTION

Figure 1:
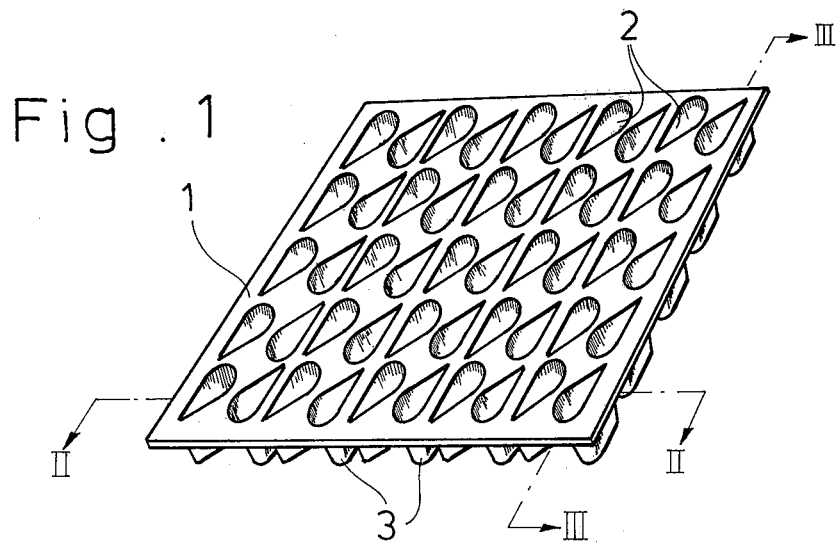
FIG. 1 shows, in perspective, a seedling raising cell structure according to the invention.
Figure 2:
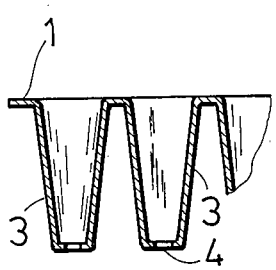
FIG. 2 shows the cross section along the line II-II in FIG. 1.
Figure 3:
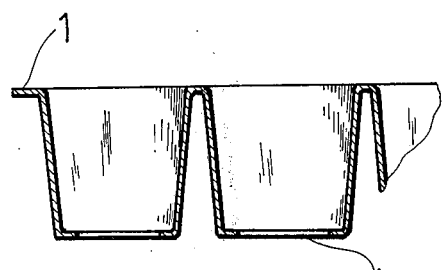
FIG. 3 shows the cross section along the line III-III in FIG. 1.
Figure 4:
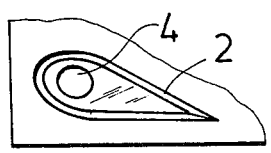
FIGS. 4, 5 and 6 illustrate, in top view, various alternative embodiments of one cell.
Figure 5:
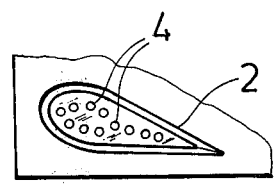
Figure 6:
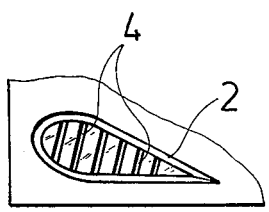

Referring now to FIG. 1, this shows a group of open mouth cells, or a cell structure, made from a plastic sheet 1, providing a planar plate or surface from which has been deep-drawn to form cells 3. Each cell 3 has a plurality of side walls extending from the planar plate and a bottom joining the side walls. The cells are spaced laterally apart and have a shape such that, for the reason stated above, they have one acute angle formed between a pair of the side walls, as can be seen in FIGS. 1, 4, 5 and 6. In view of space economy, the cells have been interspaced so that every second cell has its acute angle pointing in the same direction. As shown in FIGS. 2 and 3, the side walls of the cells 3 are tapered so that empty cell structures can be stacked that is they taper inwardly toward the bottom. A certain degree of taper is also required by the deep-drawing technique by which the plastic material is shaped. The plastic materials which can be used include: polystyrene, mixed polymers of polystyrene, rubber-modified polystyrene, and polyvinyl chloride. The plastic materials may also be pigmented or contain inorganic fillers. The bottom of each cell 3 has apertures 4, as shown in FIGS. 2 and 3. The apertures 4 may be produced by different means, considering however that the growth substrate of the sapling should be positively held in the cell during the different handling steps. In FIG. 3, for instance, the aperture 4 is a longitudinal slit in the bottom of the cell 3, preferably located in the centre of the bottom. In FIG. 4, again, the aperture 4 is a circular hole in the wider end of the bottom. FIGS. 5 and 6 show an embodiment wherein the bottom of the cell 3 has almost entirely been perforated with small holes 4 or with transversal slits 4, respectively.

What is claimed is:

1. Improvement in a cell structure for raising seedlings comprising a planar plate, wherein the improvement comprises a plurality of laterally spaced cells formed from and extending from one side of said plate with each said cell having an open mouth in the plane of said plate, each of said cells comprising a closed tear-shaped wall comprising two portions meeting at one end in an integral bend forming an acute angle with an archlike third portion connecting the two portions at their ends opposite the acute angle and a bottom joining the edges of said closed tearshaped wall spaced outwardly from said plate, said bottom forming a closure for said cell opposite and spaced from the open mouth of said cell, the integral bend formed by the two portions of said wall extending between said plate and the bottom of said cell, said two portions and said third portion of said wall tapering inwardly relative to one another as they extend outwardly from said plate toward said bottom so that the area of said bottom of each said cell is smaller than the area of its open mouth thereby a plurality of the cell structures can be fitted one into the other in a stacked arrangement, and the bottom of said cells being permeable to water.

2. A cell structure, as set forth in claim 1, wherein said third portion of said wall having a rounded shape when viewed in section parallel to said plate.

3. A cell structure, as set forth in claim 1, wherein the bottoms of said cells each have a circular hole therethrough so that the bottoms are permeable to water.

4. A cell structure, as set forth in claim 1, wherein the bottoms of said cells each have a plurality of small holes therethrough so that the bottoms are permeable to water.

5. A cell structure, as set forth in claim 1, wherein the bottoms of said cells each have a plurality of elongated slits therethrough so that the bottoms are permeable to water.

6. A cell structure as set forth in claim 1, wherein the bottom of each said cell is disposed in a plane parallel to the plane of said plate.

7. A cell structure, as set forth in claim 1, wherein said plate is formed of a sheet plastic material.

* * * * *